US011518517B2

(12) United States Patent
Bates et al.

(10) Patent No.: US 11,518,517 B2
(45) Date of Patent: Dec. 6, 2022

(54) PREDICTIVE PREFERENCE SELECTION FOR IN-VEHICLE ENTERTAINMENT SYSTEMS

(71) Applicant: Panasonic Avionics Corporation, Lake Forest, CA (US)

(72) Inventors: Steven Bates, Mission Viejo, CA (US); Philip Watson, Lake Forest, CA (US); Samir Lad, Dublin, CA (US); Anand Desikan, San Ramon, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 0 days.

(21) Appl. No.: 16/551,500

(22) Filed: Aug. 26, 2019

(65) Prior Publication Data

US 2021/0061471 A1 Mar. 4, 2021

(51) Int. Cl.
*B64D 11/00* (2006.01)
*G06N 3/02* (2006.01)
*G06Q 20/12* (2012.01)
*G06F 16/957* (2019.01)
*G06F 16/435* (2019.01)

(52) U.S. Cl.
CPC ...... *B64D 11/00152* (2014.12); *G06F 16/435* (2019.01); *G06F 16/9574* (2019.01); *G06N 3/02* (2013.01); *G06Q 20/123* (2013.01)

(58) Field of Classification Search
CPC .. B64D 11/00152; G06Q 20/123; G06N 3/02; G06F 16/9574; G06F 16/435; H04N 21/2146; H04N 21/25; H04N 21/251; H04N 21/254; H04N 21/2542; H04N 21/25891; H04N 21/41422; H04N 21/44213; H04N 21/44222; H04N 21/44224; H04N 21/4532; H04N 21/466; H04N 21/4662; H04N 21/4666; H04N 21/4667; H04N 21/4668

USPC .......................................................... 725/76

See application file for complete search history.

(56) References Cited

U.S. PATENT DOCUMENTS

| | | | |
|---|---|---|---|
| 9,594,751 B1 | 3/2017 | Gill et al. | |
| 10,358,116 B1 * | 7/2019 | Jayaraman | B60R 25/102 |
| 10,691,955 B1 * | 6/2020 | Correia Gracio | G06K 9/00771 |
| 10,762,928 B1 * | 9/2020 | Camus | H04N 21/42201 |

(Continued)

FOREIGN PATENT DOCUMENTS

CN 106447387 2/2017

*Primary Examiner* — Nnenna N Ekpo
(74) *Attorney, Agent, or Firm* — Perkins Coie LLP

(57) ABSTRACT

Devices, systems and methods for providing customized entertainment or productivity options to passengers on commercial passenger vehicles are disclosed. An exemplary method implemented by a computer on a commercial passenger vehicle includes receiving and storing from a server system communication on a memory and a display screen of a portable device of a passenger, prior to a start of a current travel segment of the commercial passenger vehicle, data for predictive preference selection during the current travel segment; determining, during the current travel segment, for the passenger, a personalized display menu of the passenger for one or more items or services from a plurality of items and services; and providing, during the travel segment, an interactive session having the personalized display menu based on the traveler profile and displayed on the display screen for the passenger on the portable device based on the determining.

24 Claims, 4 Drawing Sheets

(56) References Cited

U.S. PATENT DOCUMENTS

| | | | |
|---|---|---|---|
| 2008/0133705 A1* | 6/2008 | Lemond | G06Q 30/04 |
| | | | 709/217 |
| 2009/0288123 A1* | 11/2009 | Havlovick | B64D 11/0624 |
| | | | 725/77 |
| 2013/0324070 A1* | 12/2013 | Bennett | H04W 84/005 |
| | | | 455/404.1 |
| 2014/0108108 A1 | 4/2014 | Artman et al. | |
| 2016/0078456 A1* | 3/2016 | Chakraborty | G06Q 30/0204 |
| | | | 705/7.31 |
| 2016/0214481 A1* | 7/2016 | Othmer | B60K 37/06 |
| 2016/0292594 A1 | 10/2016 | Narayanan et al. | |
| 2016/0323731 A1 | 11/2016 | Mohammed et al. | |
| 2016/0335686 A1 | 11/2016 | Athulurutlrumala et al. | |
| 2017/0371608 A1* | 12/2017 | Wasserman | G06F 3/14 |
| 2018/0234707 A1* | 8/2018 | Pujia | H04N 21/4227 |

\* cited by examiner

On the Way to Singapore

Welcome Back Ms. Johnson. While on your way, you may want one of the following

Predicted Preference Listing:

1. Jim Beam and Coke (Last Trip ordered 2; this trip, buy 2, get 1 free)
2. Fruit Cup with Snickers and Tossed Salad (New Item)
3. Complimentary Peanuts and Cookies (available)
4. Plush Toys (New Item)
5. Black Hole (New Movie available for viewing)

*Let us know how we can be of service to you ... XXX Airlines

PREDICTIVE PREFERENCE SELECTION FOR IN-VEHICLE ENTERTAINMENT SYSTEMS

TECHNICAL FIELD

This document is directed generally to enhancing the passenger experience in commercial passenger vehicles.

BACKGROUND

Commercial travel has evolved to provide customized entertainment and software options to passengers. Increasing personalized interaction opportunities with passengers on airplanes, trains and motor coaches (busses), for example, are integral to current and future on-board and in-vehicle entertainment systems.

SUMMARY

Embodiments of the disclosed technology advantageously enable commercial passenger vehicle companies to increase revenue by providing a scalable implementation for personalized passenger interaction and upselling and cross-selling opportunities. In an example, this is achieved by using a traveler profile for a passenger to deliver a tailored or personalized set of options to the passenger, which is updated based on a machine learning/neural network that considers passenger demographics, past purchases, experiences and behaviors.

In one exemplary aspect, a method implemented in a commercial passenger vehicle includes storing from a server system communication on a memory and a display screen of a portable mobile device (PED) and/or a portable screen monitor (PCM) of the passenger prior to a start of a current travel segment of the commercial passenger vehicle, data for predictive preference selection during the current travel segment; determining, during the current travel segment, a personalized display menu for the passenger of one or more items or services from a plurality of items and services, wherein the determining is based on a traveler profile of the passenger that comprises at least one of biographic or demographic information for the passenger, a duration of a previous travel segment or the current travel segment, an origin or a destination of the previous travel segment or the current travel segment, a seat class in the previous travel segment or the current travel segment, a mileage membership status and the data for predictive preference selection; and providing, during the travel segment, an interactive session having a personalized display menu based on the traveler profile on the display screen of the PED and/or the PCM to the passenger based on the determining.

In another exemplary aspect, a method implemented in a commercial passenger vehicle includes updating from the server system and storing on a memory and a display screen of at least one of a portable mobile device (PED) or a portable screen monitor (PCM) of a passenger prior to a start of a current travel segment of the commercial passenger vehicle, a machine learning/neural network for predictive preference selection during the current travel segment; determining, during the current travel segment and using the machine learning/neural network, for the passenger, a personalized display menu of the passenger for one or more items or services from a plurality of items and services, wherein the determining is based on a traveler profile of the passenger that comprises at least one of biographic or demographic information for the passenger, a duration of a previous travel segment or the current travel segment, an origin or a destination of the previous travel segment or the current travel segment, a seat class in the previous travel segment or the current travel segment and a mileage membership status; and providing, during the travel segment, an interactive session having the personalized display menu responsive to the traveler profile on the display screen of the passenger for the PED and/or the PCM to the passenger based on the determining.

In yet another exemplary aspect, a method implemented in a commercial passenger vehicle includes storing from a computer on a memory and a display screen of a PED and/or PCM of the passenger, prior to a start of a current travel segment of the commercial passenger vehicle, data for predictive preference selection during the current travel segment; determining, during the current travel segment, for a passenger, one or more items or services from a plurality of items and services, wherein the determining is based on a traveler profile of the passenger that comprises at least one of biographic or demographic information for the passenger, a duration of a previous travel segment or the current travel segment, an origin or a destination of the previous travel segment or the current travel segment, a seat class in the previous travel segment or the current travel segment, a mileage membership status and the data for predictive preference selection; and providing, during the travel segment, an interactive session having the personalized display menu, based on to the traveler profile, displayed on the display screen of the passenger for the PED and/or the PCM to the passenger based on the determining, and wherein the interactive session comprises at least one upsell or cross-sell recommendation to the passenger.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 2 shows an example of a predictive preference selection in an in-flight entertainment (IFE) system.

DETAILED DESCRIPTION

In commercial passenger vehicles, vehicle entertainment systems broadcast content to cabin projection/video screens (e.g., seatback monitors, Personal Electronic Devices (PEDs), or other mobile electronic devices for viewing movies, television shows, and other videos). These vehicle entertainment systems typically include hardware and software components that enable the passenger to have a more relaxed and/or productive journey. For example, seatback monitors utilize a combination of a custom core software program and one or more software programs when displaying video content on a display screen and outputting sound to one or more output ports, e.g., headphone jack(s). For another example, local Wi-Fi network channels are leveraged to broadcast movies, television shows, and the like to PEDs, laptops or other mobile devices.

However, current implementations of customized (or personalized or individualized) vehicle entertainment systems that cater to the needs and wants of a specific passenger typically take several months or years before deployment into a vehicle. Due to the customized nature of the software and hardware design process (e.g., which may be implemented by vehicle or cruise-line manufacturers, system designers, maintenance crews, airline companies or end-users), these systems generally have decreased scalability for other applications.

Furthermore, since the development and deployment process of these customized vehicle entertainment systems may stretch out over several months (or even years), innovative aspects of these vehicle entertainment systems may be reduced due to rapidly changing interim technologies. In addition, the customization process typically results in higher costs.

The technology described in the present document may be used by embodiments of a vehicle entertainment system that provides one or more of the following improvements over existing vehicle entertainment systems: create more opportunities to increase interactions with the various people associated with the vehicle (e.g., direct and indirect customers, which include vehicle manufacturers, vehicle passengers, maintenance crews and system designers), improve scalability for other applications, provide solutions and outcomes with a faster time to market, improve innovation, and provide a lower overall cost to their customers.

Figure 1:
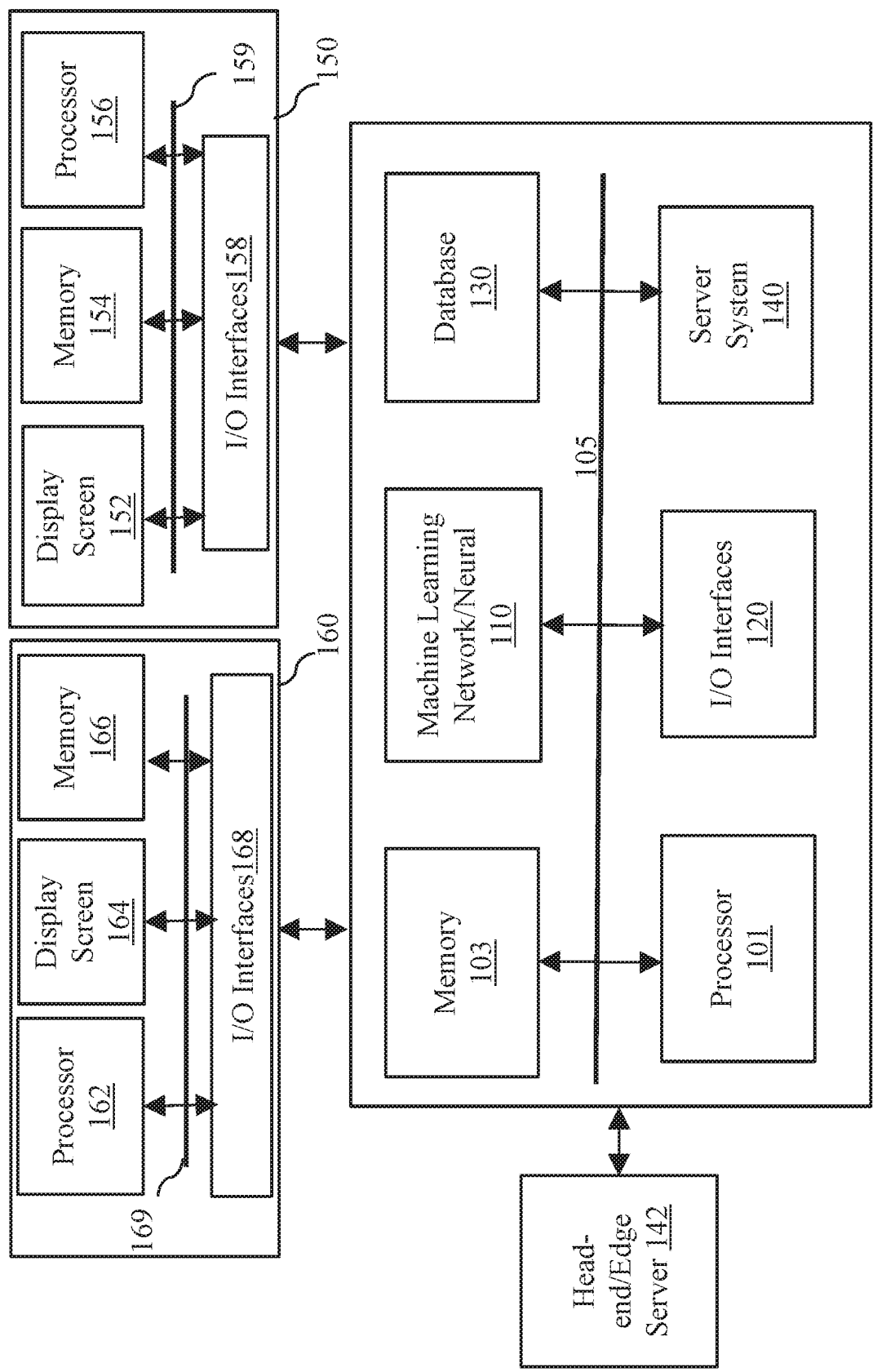
FIG. 1 shows an example architecture of a device that can provide a predictive preference selection for in-vehicle entertainment systems.

FIG. 1 shows an example architecture of a device 100 (e.g., a computer) that can provide a predictive preference selection for in-vehicle entertainment systems. As shown therein, the device may include a processor 101 (e.g., a central processing unit, also called a central processor or main processor, is the electronic circuitry within a computer that carries out the instructions of a computer program by performing the basic arithmetic, logic, controlling, and input/output operations specified by the instructions) and a memory 103, which are connected to a bus 105. In an example, the bus 105 may be a Controller Area Network (CAN) bus. In another example, the bus 105 may be an avionics data bus (e.g., ARINC 429, 629 or 664). The processor 101 and memory 103 are further connected, via the bus 105, to at least a machine learning/neural network 110, input/output (I/O) interfaces 120, a database 130 and a server system 140.

In some embodiments, one or more of the components of the device 100, shown in FIG. 1, may be combined, or implemented independently in another device. For example, the server system 140 may not be directly connected to the bus 105, but may be connected to a different bus (not shown in FIG. 1) that can communicate (either through a wired or wireless connection) with bus 105. For another example, the database 130 may be part of the server system 140, instead of a separate component, and could include multiple databases, each of which may be populated with passenger data from an independent source (e.g., different airlines, retailers, wholesalers, etc.). Alternative embodiments of the architecture shown in FIG. 1, which advantageously enable providing a predictive preference selection for in-vehicle entertainment systems, include various combinations of the components shown therein.

Embodiments of the disclosed technology, which include the example architecture shown in FIG. 1, a predicted preference listing is received from a server system 140 and/or a head-end/edge server 142 (e.g., a data server wherein initially information (e.g., passenger data) is loaded on the commercial passenger vehicle) through I/O interfaces 120 and displayed on a personal electronic device (PED) and/or portable screen monitor (PCM) (designated as device 150, e.g., having a display screen 152, memory 154, processor 156, I/O interfaces 158, and bus 159) of a passenger, for example, in an assigned seat or an occupied seat, via the I/O interfaces 120 of the device 100 (e.g., computer 100). In some embodiments, as illustrated in FIG. 1, one or more portions of predicted preference listing or news bulletins, for example, from one or more passengers' personal electronic devices (PEDs) and/or portable screen monitors (PCMs) 150 are communicated from a server system 140 and/or a head-end/edge server 142 (e.g., a data server wherein initially information (e.g., passenger data) is loaded on the commercial passenger vehicle) through I/O interfaces 120 and displayed on a crew terminal panel and/or crew personal electronic device (PED) 160. For example, a crew terminal panel and/or a crew personal electronic device (PED), e.g., designated as device 160, has processor 162, display screen 164, memory 166, I/O interfaces 168, and bus 169. For example, a crew terminal panel or a crew personal electronic device 160 can be vehicle manufacturers, vehicle workers, vehicle $3^{rd}$ party vendors and customers, vehicle employees, maintenance crews and system designers for operation, maintenance, or other activities of the commercial passenger vehicle (e.g., an airplane, bus or motor coach). In some embodiments, the predicted preference listing is based on past purchases, interests, and other available collected or stored information (e.g., from third-party applications or databases) of the passenger. When the passenger makes a selection or requests one of the goods or services on the predicted preference listing, the server system 140 records the selection or request, and updates the predicted preference listing.

The embodiments described in this document are directed to delivering a predictive preferential (or personalized) experience to a passenger based on their past usage. This tailored approach is achieved by selecting specific items from a plethora of available choices and displaying only the preferred choices of the passenger to that passenger in a travel segment on the commercial passenger vehicle (e.g., an airplane, bus or motor coach). These embodiments advantageously increase monetization opportunities for the airline, as well as increase the loyalty of the passenger to that airline, since patterns of the passenger's past behaviors are used to drive their entertainment and on-board storefront options and choices.

In some embodiments, the predicted preference listing is developed using a machine learning/neural (ML/N) network with inputs that include information (e.g., past purchases, interests, etc.) for the passenger and other passengers (e.g., from previous, current or future flights) with similar, complementary, or conflicting traits or characteristics. In an example, the ML/N can be configured to recognize correlations, patterns or relationships that exist within interactions between the passenger and the other passengers based on traits and characteristics for each of the individuals. In another example, the traits and characteristics can include age, weight, sex, date of birth, marital relationship, preference for specific foods and/or beverages, outdoor activities, time and day of travel, reason for travel (e.g., bachelor party, business, divorce, marriage, honeymoon, etc.), and/or past and recent purchases.

In some embodiments, the ML/N network is used to curate a personalized experience for the passenger that is not just based on current circumstances or conditions, but rather an amalgamation of their likes, dislikes and patterns of behavior. In the example of the commercial passenger vehicle being an airline with a mileage program, a passenger who frequently flies first class (and has an elevated mileage program status) may be in an economy class seat for a current flight. Embodiments of the disclosed technology can be configured to recognize that this is a valued passenger, and either upgrade him to business or first class (if seats are available) or provide him with additional amenities and opportunities (via the predicted preference listing) despite him being in an economy class seat. This may increase the passenger's loyalty to the airline, and can be achieved only if a broader range of traits, characteristics and behaviors are considered (as compared to just current information), as is performed by embodiments of the disclosed technology.

In some embodiments, the predicted preference listing can be configured to provide upselling and cross-selling recommendations to the passenger in an assigned seat and/or an occupied seat. For example, the ML/N network can be configured to recommend merchandise based on a movie the passenger is watching. For another example, the recommended merchandise may be selected based on passenger demographic information (e.g., does the passenger have children who would enjoy playing with toys based on a movie?). For another example, the recommended merchandise may include accessories based on the weather of the destination of the current travel segment (e.g., sunglasses and sunscreen or a coat based on the current travel segment destination being sunny or cold, respectively).

In some embodiments, the predicted preference listing may be configured to provide demand forecasting (e.g., time, event or situational predictions) to third-party providers (e.g., wholesalers, retail stores, on-line vendors, marketplace participants, etc.) of trends, needs, and purchases of the passenger of an assigned seat and/or an occupied seat responsive to predicted preference listing.

In some embodiments, the predicted preference listing may be updated in real time on the commercial passenger vehicle due to passenger demand. For example, the predicted preference listing on PED and/or PCM 150 may be updated in memory 154 during flight and updated new information flash across the display screen 152. For example, news bulletin that a food item (e.g., chicken sandwich) is great or avoid a food item (e.g., steak sandwich is not tender), new release movie number 7 is great and watch right now, new release movie number 8 is bad and don't bother watching.

FIG. 2 shows an example of a predictive preference selection in a portable mobile device (PED) or a portable screen monitor (PCM). In one example, the PCM is an in-flight entertainment system (IFE). In another example, the PED and/or the PCM can be together or separately the IFE. As shown therein, the passenger in a specific seat (e.g., an assigned seat, an occupied seat, or the like) is identified as Ms. Johnson, and specifically curated items are recommended during her flight to Singapore. For example, the predictive preference selection having a personalized display menu, e.g., that displays one or more portions of the predicted preference listing, at an assigned seat or an occupied seat of the passenger in the IFE which includes:

1. A beverage recommendation based on a previous purchase, as well as a deal to incentivize purchasing the same beverage during this travel segment
2. A new item that could be based, for example, on previously determined food preferences. In another example, this food pairing may be determined by the ML/N network based on food preferences of other passengers in the same demographic as Ms. Johnson.
3. A complimentary offering that is recommended so as to induce additional purchases of either food or entertainment by Ms. Johnson.
4. A merchandise offering, which could be based on, for example, demographic and travel information about Ms. Johnson (e.g., going to visit a niece or nephew).
5. A new movie offering, which could be based on, for example, previous movies viewed by Ms. Johnson on previous flights. For another example, the new movie offering could be based on third-party recommendations (e.g., Netflix or Internet Movie Database (IMDB)).

Any selection or purchase from the recommendations shown in FIG. 2 is used, at the end of the flight, to update a traveler profile and/or a subsequent predictive preference selection for Ms. Johnson. In an example, the preferred listings in a subsequent flight will be based on purchases made on this flight. In another example, the purchases made in this flight by Ms. Johnson can be made available to third-party marketplaces.

The data-centric and ML/N network-based approach of embodiments of the disclosed technology enable customized in-vehicle entertainment systems to be deployed with minimized logistical requirements (compared to existing implementations). Reduced logistical requirements and the ability to integrate and process data from multiple sources, as well as to provide analytic tools back to those sources, support the scalability of the solutions described in this document. Exemplary embodiments use fewer resources to deploy an in-vehicle entertainment system that benefits both the customer and stakeholders, as well as the market participants.

Figure 3:
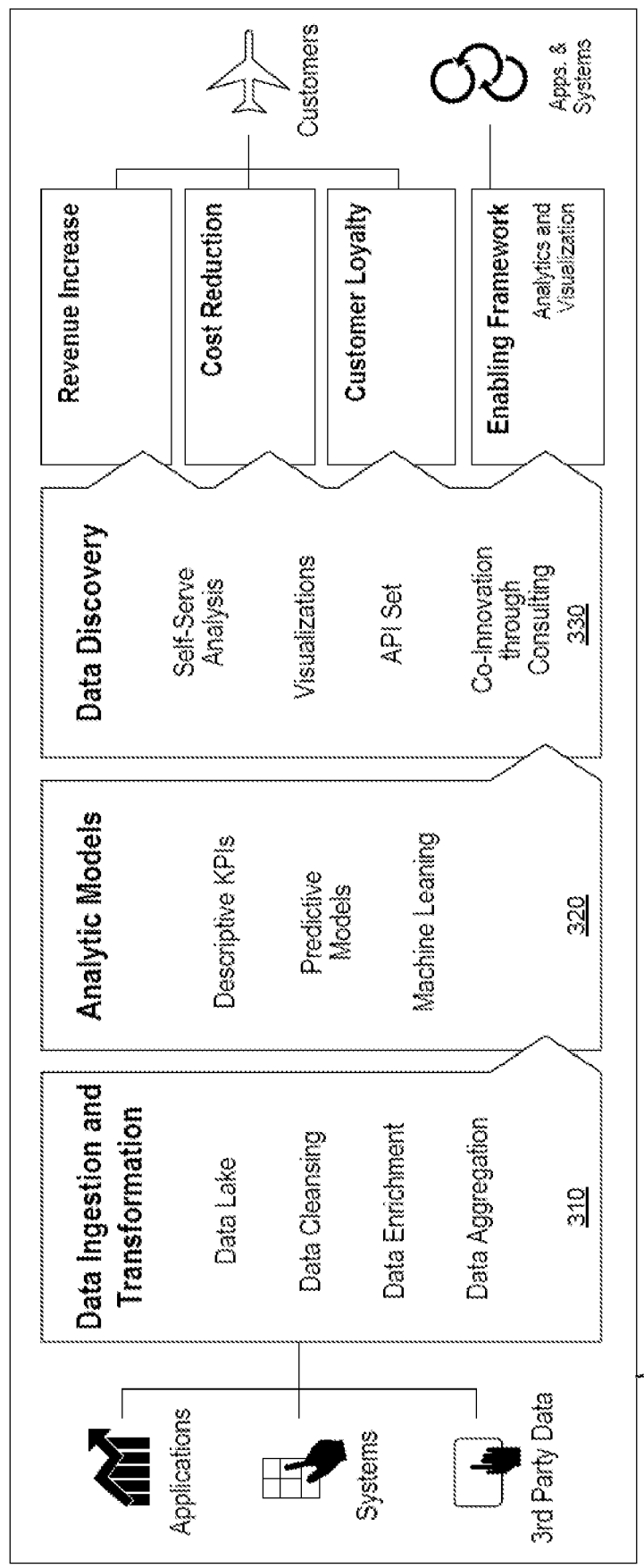
FIG. 3 shows an example framework for providing a predictive preference selection for in-vehicle entertainment systems.

FIG. 3 shows an example framework for providing a predictive preference selection for in-vehicle entertainment systems. As shown therein, the framework includes data inputs (e.g., applications, systems and third-party data), outputs (e.g., revenue increase, cost reduction, customer loyalty and enabling frameworks) and internal processes (e.g., data ingestion and transformation, analytic models and data discovery), which convert the input data into intelligent actionable outcomes.

In some embodiments, the internal processes include a data ingestion and transformation process 310, which includes a data lake that performs a data collection operation based on the application, system and third-party data inputs. In an example, the data lake uses a store-and-forward mechanism for data collection and dissemination since connectivity on a commercial passenger vehicle, e.g., an airplane, an airplane, bus or motor coach or the like, may not always be continuously available.

The data ingestion and transformation process 310 further includes a data cleansing operation, which may be required since some of the data used by embodiments of the disclosed technology is collected in an off-line environment. In another example, since more than one passenger may occupy a row in a commercial passenger vehicle, purchases by or complimentary offering to passengers must be differentiated by the data cleansing operation. In yet another example, a passenger switching seats in the middle of a travel segment may results in data that needs to be cleansed prior to further processing.

The data ingestion and transformation process 310 further includes a data enrichment operation that is required since data is collected from multiple sources (e.g., internal sources, external sources and/or syndicated sources). The data enrichment operations increase the value of the data, thereby preparing it for the next level of processing.

The data ingestion and transformation process 310 further includes a data aggregation operation that can be configured to combine the cleansed and enriched data. In an example, the data is aggregated across multiple flights, multiple airlines, and the like.

The aggregated data is processed by the analytic models and processes 320, which include descriptive (and measurable) key performance indicators (KPIs) that can be used to quantify various aspects of passengers' behaviors over the travel segment. For example, a KPI that could be used is the number of passengers that are watching a particular movie. For another example, KPIs may be determined for different sectors of a passenger's journey.

The analytic models and processes 320 further include predictive models and machine learning/neural implementations, which are used to generate the predicted preference listing (e.g., the example shown in FIG. 2). In some embodiments, the machine learning/neural networks use supervised learning, unsupervised learning, or a combination thereof. In other embodiments, the predictive models may include other pattern recognition networks that are used in conjunction with the machine learning/neural networks.

The output of the analytic models and processes 320 include predictive preference selections that can be used for a number of different purposes, as shown in the data discovery process 330. The data discovery process 330 provides multiple frameworks that allow the predictive outputs to be analyzed by customers, passengers and third-party participants.

For example, the analytic models and processes 320 may include self-serve analytics that allow passengers and airline customers to analyze their own data, and in an example, provides them with dashboards to assist in the analysis. For another example, anonymized data from other passengers may also be made available for analysis.

For example, the analytic models and processes 320 may include visualization tools and application programming interface (API) sets that can also be used by third-party developers and different industry participants (e.g., retailers, wholesalers, etc.) to allow the predictive models and machine learning/neural networks to be changed and/or updated. The visualization tools and API sets could be used to deploy the data for other purposes, e.g., inventory control.

For example, the analytic models and processes 320 may include co-innovation through consulting, which leverages third-party and industry participant expertise to improve the predictive models and machine learning/neural networks.

In some embodiments, the internal processes (e.g., data ingestion and transformation, analytic models and data discovery) advantageously enable the actionable outcomes, such as revenue increase, cost reduction, customer loyalty and enabling frameworks (which provides visualization and analytical tools) that can be used by other parties.

Embodiments of the disclosed technology will raise revenue for airlines, retailers, and market participants. For example, the airlines can obtain subscription-based revenues from the retailers, and/or revenue sharing from on-line passenger purchases, which will reduce overall costs for maintaining an inflight entertainment system.

Figure 4:
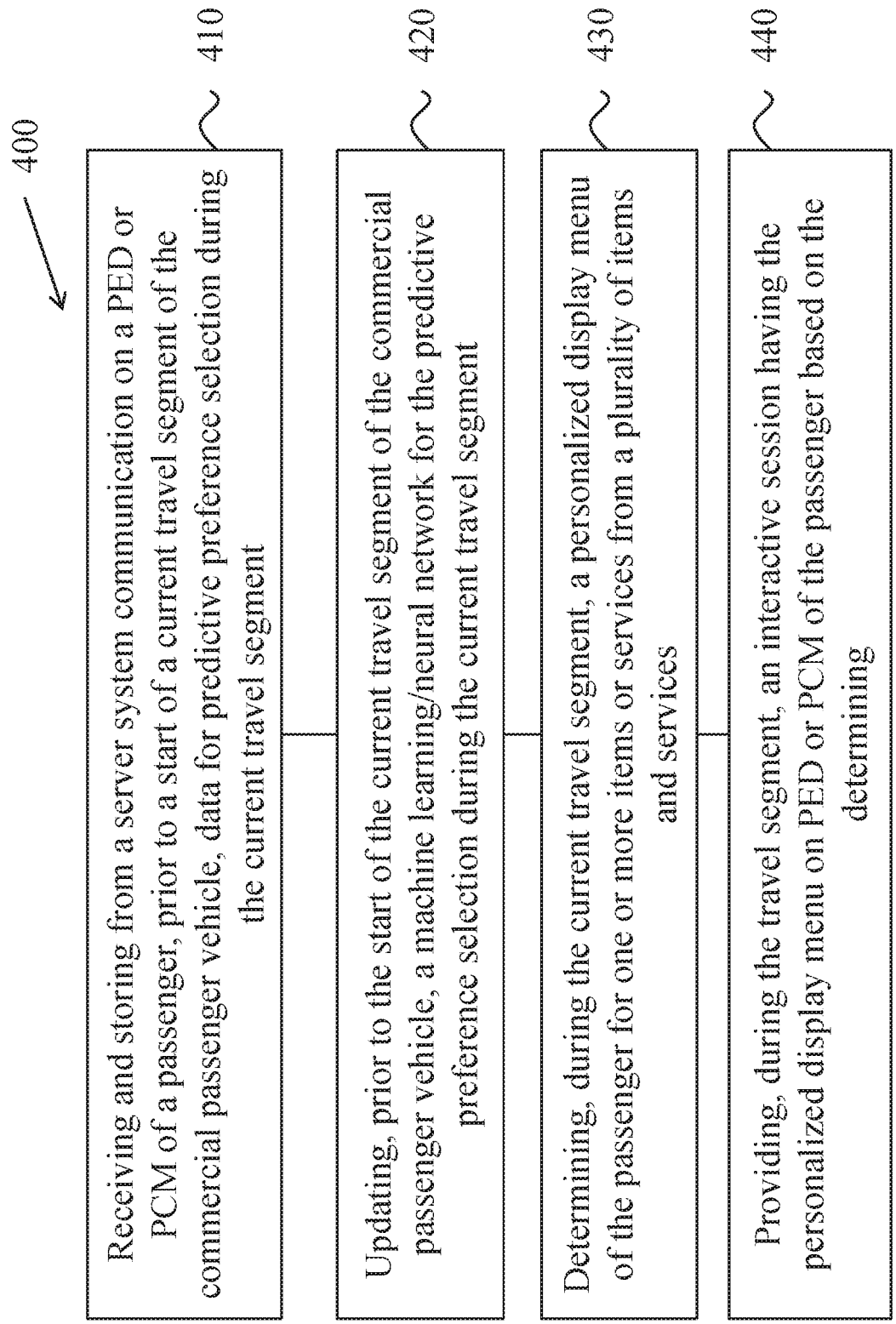
FIG. 4 shows a flowchart of an example method for providing a predictive preference selection for in-vehicle entertainment systems.

FIG. 4 shows a flowchart of an example method 400 for providing a predictive preference selection for in-vehicle entertainment systems, in accordance with embodiments of the disclosed technology. The method 400 includes, at step 410, receiving and storing from a server system on a memory and a display screen of a PED and/or a PCM 150 of a passenger, prior to a start of a current travel segment of the commercial passenger vehicle, data for predictive preference selection during the current travel segment. In some embodiments, the commercial passenger vehicle is an airplane, a train or a motor coach.

The method 400 includes, at step 420, updating, prior to the start of the current travel segment of the commercial passenger vehicle, a machine learning/neural network for the predictive preference selection during the current travel segment.

In some embodiments, the method 400 may include only step 410, or only step 420, or both steps 410 and 420.

The method 400 includes, at step 430, determining, during the current travel segment, for the passenger, a personalized display menu (e.g., displaying one or more portions of a predicted preference listing) at an assigned seat or an occupied seat of the passenger for one or more items or services from a plurality of items and services. In some embodiments, the determining is based on a traveler profile of the passenger that includes at least one of biographic or demographic information for the passenger, a duration of a previous travel segment or the current travel segment, an origin or a destination of the previous travel segment or the current travel segment, a seat class in the previous travel segment or the current travel segment, a mileage membership status and the data for predictive preference selection.

In some embodiments, and as described in step 430, the traveler profile may be based on "static" information that has been collected about the passenger, which excludes interactions between the passenger and the in-vehicle entertainment system. Using only non-interactive data to develop customized offerings advantageously allows new passengers who have not used a particular commercial carrier to be presented with a curated travel experience that they may not have been expecting since they had never used this commercial carrier before.

The method 400 includes, at step 440, providing, during the travel segment, an interactive session to the passenger based on the determining.

In some embodiments, the plurality of items and services comprise in-vehicle entertainment items and on-board storefront items.

In some embodiments, the method 400 further includes the steps of collecting, during the travel segment, passenger behavior data and information from the interactive session; and updating, at an end of the travel segment and using a machine learning/neural network, the data for predictive preference selection for a future travel segment based on the collecting. For example, the predictive preference selection (and/or traveler profile) that was initially developed based on only "static" or non-interactive information can now be updated based on interactions that the passenger has had on their first journey with the commercial carrier.

In some embodiments, the determining is further based on past purchases by the passenger on the previous travel segment, third-party information about the passenger or passenger behavior data.

In some embodiments, the method 400 further includes receiving, from the passenger, an indication of a purchase of at least one of the one or more items or services.

In some embodiments, the method 400 further includes updating the traveler profile of the passenger based on past purchases or the indication of the purchase.

In some embodiments, the determining is based on a machine learning/neural network or a pattern matching network. For example, the determining based on the ML/N network is an example of an online implementation, which results in the predictive preference selection being updated in real-time based on purchases or requests made by the passenger.

In some embodiments, the method 400 further includes generating, based on a machine learning/neural network or a pattern matching network, the traveler profile of the passenger. For example, the traveler profile being updated based on the ML/N network is an example of an offline implementation, which may be conducted at an end of the current travel segment.

In some embodiments, the one or more items or services comprises a first set of items or services upon a determination that the current travel segment is a short-haul flight, wherein the one or more items or services comprises a second set of items or services upon a determination that the current travel segment is a long-haul flight, and wherein the first set of items or services is different from the second set of items or services.

In some embodiments, the interactive session (e.g., having the personalized display menu based on the traveler profile on a display screen at an assigned seat or an occupied seat of the passenger for a PED and/or a PCM) comprises at least one upsell or cross-sell recommendation to the passenger. For example, third parties and market participants can provide recommendations and data, which are incorporated into the machine learning/neural network, and then made available in the predictive preference selection.

In some embodiments, the method 400 further includes the step of updating the personalized display menu of one or more passengers at assigned seats or occupied seats with one or more real-time, in-flight news bulletins from other passengers during flight of the one or more items or the services that include at least one of likes and dislikes.

In some embodiments, the method 400 further includes the step of updating the personalized display menu of one or more passengers at assigned seats or occupied seats with one or more real-time, in-flight news bulletins from other passengers during flight of the one or more items or services and include at least one of updating, at an end of the travel segment and using a machine learning/neural network, the data for predictive preference selection of the machine learning/neural network with the one or more real-time, inflight news bulletins from the other passengers likes and dislikes.

In some embodiments, the method 400 further includes the step of updating by at least one of a crew terminal panel and a crew PED the personalized display menu of one or more passengers in assigned seats or occupied seats, in real-time, with one or more in-flight news bulletins responsive to other passengers likes and dislikes during flight of the one or more items or services.

In some embodiments, the method 400 further includes the step of updating by at least one of a crew terminal panel and a crew PED the personalized display menu of one or more passengers at assigned or occupied seats with one or more real-time, in-flight news bulletins from other passengers during flight of the items or the services and include at least one of updating, at an end of the travel segment and using a machine learning/neural network, the data for predictive preference selection of the machine learning/neural network with the one or more real-time, inflight news bulletins from the other passengers likes and dislikes of the one or more items or services.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this patent document.

What is claimed is:

1. A method implemented by a computer on a commercial passenger vehicle, the method comprising:
   receiving and storing, from a server system, a communication on a memory and a display screen of at least one of a portable mobile device (PED) or a portable screen monitor (PCM) of a passenger, prior to a start of a current travel segment of the commercial passenger vehicle, data for predictive preference selection during the current travel segment;
   determining, during the current travel segment, a personalized display menu of the passenger for one or more items or services from a plurality of items and services, wherein the determining is based on a traveler profile of the passenger that comprises at least one of biographic or demographic information for the passenger, a duration of a previous travel segment or the current travel segment, an origin or a destination of the previous travel segment or the current travel segment, a seat class in the previous travel segment or the current travel segment, a mileage membership status and the data for predictive preference selection;
   displaying, during the current travel segment, an interactive session having the personalized display menu responsive to the current travel segment based on the traveler profile and based on, in real-time due to the passenger demand, the current travel segment; and
   receiving, from the passenger, an indication of a purchase of at least one of the one or more items or services displayed on the display screen of the at least one of the PED or the PCM to the passenger based on the determining,
   wherein the determining the personalized display menu comprises:
      a data collection operation that uses a store-and-forward mechanism, at the at least one of the PED or the PCM of the passenger, for data collection and dissemination on the commercial passenger vehicle on the current travel segment in response to a data connection between the server system and the at least one of the PED or the PCM of the passenger on the commercial passenger vehicle being non-continuous,
      a data cleansing operation that cleanses data associated with (a) data collected in an off-line environment by the at least one of the PED or the PCM and (b) data collected from a different passenger by the at least one of the PED or PCM during the current travel segment, and
      a data processing operation that processes data by using a machine learning/neural network and generates a predictive output, wherein the data comprises anonymized data from other passengers on the current travel segment, and wherein the predictive output is provided to the passenger.

2. The method of claim 1, wherein the commercial passenger vehicle is an airplane, a train or a motor coach.

3. The method of claim 1, wherein the plurality of items and services comprise in-vehicle entertainment items and on-board storefront items.

4. The method of claim 1, further comprising:
   collecting, during the current travel segment as part of the data collection operation, passenger behavior data and information from the interactive session; and
   updating, at an end of the current travel segment and using the machine learning/neural network, the data for predictive preference selection for a future travel segment based on the collecting.

5. The method of claim 1, wherein the determining is further based on past purchases by the passenger on the previous travel segment, third-party information about the passenger or passenger behavior data.

6. The method of claim 1, further comprising:
   updating the traveler profile of the passenger based on past purchases or the indication of the purchase.

7. The method of claim 1, wherein the determining is based on the machine learning/neural network or a pattern matching network.

8. The method of claim 1, further comprising:
   generating, based on the machine learning/neural network or a pattern matching network, the traveler profile of the passenger.

9. The method of claim 1, wherein the one or more items or services comprises a first set of items or services upon a determination that the current travel segment is a short-haul flight, wherein the one or more items or services comprises a second set of items or services upon a determination that the current travel segment is a long-haul flight, and wherein the first set of items or services is different from the second set of items or services.

10. An apparatus comprising a processor and a memory of a server system, the apparatus implemented on a commercial passenger vehicle and configured to perform a method, the method comprising:
   updating from the server system and storing on a memory and a display screen of at least one of a portable mobile device (PED) or a portable screen monitor (PCM) of a passenger, prior to a start of a current travel segment of the commercial passenger vehicle, a machine learning/neural network for predictive preference selection during the current travel segment;
   determining, during the current travel segment and using the machine learning/neural network, for the passenger, a personalized display menu of the passenger for one or more items or services from a plurality of items and services, wherein the determining is based on a traveler profile of the passenger that comprises at least one of biographic or demographic information for the passenger, a duration of a previous travel segment or the current travel segment, an origin or a destination of the previous travel segment or the current travel segment, a seat class in the previous travel segment or the current travel segment and a mileage membership status;
   providing, during the current travel segment, an interactive session having the personalized display menu responsive to the current travel segment based on the traveler profile and based on, in real-time due to the passenger demand, the current travel segment; and
   receiving, from the passenger, an indication of a purchase of at least one of the one or more items or services displayed on the display screen of the passenger for the at least one of the PED or the PCM to the passenger based on the determining, wherein the determining the personalized display menu comprises:
  a data collection operation that uses a store-and-forward mechanism, at the at least one of the PED or the PCM of the passenger, for data collection and dissemination on the commercial passenger vehicle on the current travel segment in response to a data connection between the server system and the at least one of the PED or the PCM of the passenger on the commercial passenger vehicle being non-continuous,
  a data cleansing operation that cleanses data associated with (a) data collected in an off-line environment by the at least one of the PED or the PCM and (b) data collected from a different passenger by the at least one of the PED or PCM during the current travel segment,
  a data processing operation that processes data by using the machine learning/neural network and generates a predictive output, wherein the data comprises anonymized data from other passengers on the current travel segment, and wherein the predictive output is provided to the passenger.

11. The apparatus of claim 10, wherein the commercial passenger vehicle is an airplane, a train or a motor coach.

12. The apparatus of claim 10, wherein the method further comprises:
  collecting, during the current travel segment as part of the data collection operation, passenger behavior data and information from the interactive session; and
  updating, at an end of the current travel segment and using the machine learning/neural network, the data for predictive preference selection for a future travel segment based on the collecting.

13. The apparatus of claim 10, wherein the determining is further based on past purchases by the passenger on the previous travel segment, third-party information about the passenger or passenger behavior data.

14. The apparatus of claim 10, wherein the method further comprises:
  updating the traveler profile of the passenger based on past purchases and the indication of the purchase.

15. A non-transitory computer readable storage medium having instructions stored thereupon, the instructions, when executed by a processor, causing the processor to implement a method implemented by a computer on a commercial passenger vehicle, comprising:
  instructions for receiving and storing, from the computer, on a memory and a display screen on at least one of a portable mobile device (PED) or a portable screen monitor (PCM) of a passenger, prior to a start of a current travel segment of the commercial passenger vehicle, data for predictive preference selection during the current travel segment;
  instructions for determining, during the current travel segment, for a passenger, a personalized display menu of the passenger for one or more items or services from a plurality of items and services, wherein the determining is based on a traveler profile of the passenger that comprises at least one of biographic or demographic information for the passenger, a duration of a previous travel segment or the current travel segment, an origin or a destination of the previous travel segment or the current travel segment, a seat class in the previous travel segment or the current travel segment, a mileage membership status and the data for predictive preference selection;
  instructions for providing, during the current travel segment, an interactive session having the personalized display menu responsive to the current travel segment based on the traveler profile and based on, in real-time due to the passenger demand, the current travel segment; and
  instructions for receiving, from the passenger, an indication of a purchase of at least one of the one or more items or services displayed on the display screen of the passenger for the at least one of the PED or the PCM to the passenger based on the determining,
  wherein the interactive session comprises at least one upsell or cross-sell recommendation to the passenger, and
  wherein the determining the personalized display menu comprises:
    a data collection operation that uses a store-and-forward mechanism, at the at least one of the PED or the PCM of the passenger, for data collection and dissemination on the commercial passenger vehicle on the current travel segment in response to a data connection between the server system and the at least one of the PED or the PCM of the passenger on the commercial passenger vehicle being non-continuous,
    a data cleansing operation that cleanses data associated with (a) data collected in an off-line environment by the at least one of the PED or the PCM and (b) data collected from a different passenger by the at least one of the PED or PCM during the current travel segment, and
    a data processing operation that processes data by using a machine learning/neural network and generates a predictive output, wherein the data comprises anonymized data from other passengers on the current travel segment, and wherein the predictive output is provided to the passenger.

16. The non-transitory computer readable storage medium of claim 15, wherein the commercial passenger vehicle is an airplane, a train or a motor coach.

17. The non-transitory computer readable storage medium of claim 15, wherein the biographic information for the passenger comprises activities enjoyed by the passenger, types of food and beverages consumed on the previous flight or a reason for the current travel segment, and wherein the demographic information for the passenger comprises an age, a height, a weight or a marital status of the passenger.

18. The non-transitory computer readable storage medium of claim 15, wherein the instructions further comprise:
  instructions for collecting, during the current travel segment as part of the data collection operation, passenger behavior data and information from the interactive session; and
  instructions for updating, at an end of the current travel segment and using the machine learning/neural network, the data for predictive preference selection for a future travel segment based on the collecting.

19. The non-transitory computer readable storage medium of claim 15, wherein the instructions for determining are further based on past purchases by the passenger on the previous travel segment, third-party information about the passenger or passenger behavior data.

20. The non-transitory computer readable storage medium of claim 15, wherein the instructions further comprise:

instructions for updating the traveler profile of the passenger based on past purchases and the indication of the purchase.

21. The non-transitory computer readable storage medium of claim 15, wherein the instructions further comprise:
   instructions for updating the personalized display menu of one or more passengers at assigned seats or occupied seats with one or more real-time, in-flight news bulletins from other passengers during flight of the one or more items or the services that include at least one of likes and dislikes.

22. The non-transitory computer readable storage medium of claim 15, wherein the instructions further comprise:
   instructions for updating the personalized display menu of one or more passengers at assigned seats or occupied seats with one or more real-time, in-flight news bulletins from other passengers during flight of the one or more items or services and include at least one of updating, at an end of the current travel segment and using the machine learning/neural network, the data for predictive preference selection of the machine learning/neural network with the one or more real-time, inflight news bulletins from the other passengers likes and dislikes.

23. The non-transitory computer readable storage medium of claim 15, wherein the instructions further comprise:
   instructions for updating by at least one of a crew terminal panel or a crew PED the personalized display menu of one or more passengers in assigned seats or occupied seats, in real-time, with one or more in-flight news bulletins responsive to other passengers likes and dislikes during flight of the one or more items or services.

24. The non-transitory computer readable storage medium of claim 15, wherein the instructions further comprise:
   instructions for updating by at least one of a crew terminal panel or a crew PED the personalized display menu of one or more passengers at assigned or occupied seats with one or more real-time, in-flight news bulletins from other passengers during flight of the items or the services and include at least one of updating, at an end of the current travel segment and using a machine learning/neural network, the data for predictive preference selection of the machine learning/neural network with the one or more real-time, inflight news bulletins from the other passengers likes and dislikes of the one or more items or services.

* * * * *